US006448751B1

United States Patent
Becker

(10) Patent No.: US 6,448,751 B1
(45) Date of Patent: Sep. 10, 2002

(54) POWER SUPPLY VOLTAGE GENERATOR

(75) Inventor: Rolf Friedrich Philipp Becker, Adliswil (CH)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/698,770

(22) Filed: Oct. 27, 2000

(30) Foreign Application Priority Data

Oct. 28, 1999 (EP) .............................................. 99203549

(51) Int. Cl.[7] .................................................. G05F 1/56
(52) U.S. Cl. ........................................................ 323/284
(58) Field of Search ................................ 323/282, 283, 323/284, 351

(56) References Cited

U.S. PATENT DOCUMENTS

| | | | |
|---|---|---|---|
| 5,359,300 A | | 10/1994 | Minami ........................ 331/17 |
| 6,038,684 A | * | 3/2000 | Liddell et al. ................. 714/11 |
| 6,052,754 A | * | 4/2000 | Anand ......................... 710/129 |

FOREIGN PATENT DOCUMENTS

JP    06082752    3/1994

* cited by examiner

Primary Examiner—Adolf Deneke Berhane
(74) Attorney, Agent, or Firm—Steven R. Biren

(57) ABSTRACT

This invention concerns a power supply voltage generator (1) for providing a second supply voltage ($V_{DD2}$) for an electronic circuitry (60). A voltage converter (50) receives a first supply voltage ($V_{DD1}$), and converts this into said second supply voltage ($V_{DD2}$), such that its output voltage ($V_{DD2}$) fluctuates in a control range between a lower limit ($V_{LOW}$) and an upper limit ($V_{HIGH}$). A voltage parameter source circuitry (3) generates a voltage parameter signal ($V_{LOW}$) which is substantially equal to the minimum supply voltage value ($V_{min}$) of the electronic circuitry (60), and feeds this voltage parameter signal ($V_{LOW}$) to a parameter input (53) of the converter (50). The voltage parameter source circuitry (3) comprises a VCO (10) incorporated in a PLL. The voltage parameter signal ($V_{LOW}$) is derived from a control signal ($V_{contr}$) for the VCO (10).

9 Claims, 2 Drawing Sheets

POWER SUPPLY VOLTAGE GENERATOR

BACKGROUND OF THE INVENTION

The present invention relates in general to providing a power supply voltage, more particularly a DC voltage as power supply for an electronic circuitry, particularly as power supply for a portion of an integrated circuit.

Generally speaking, in battery-operated circuitry, such as for instance used in a mobile telephone, it is desirable that the energy consumption is as low as possible. For this reason, there is a tendency to design electronic circuitry, especially components of an integrated circuit, to operate at as low a voltage as possible. For instance, many of the components of an integrated circuit are able to operate with a supply voltage of 1.3 V. However, it may be that some of the components of an integrated circuit need a higher operating voltage, for instance 3 V, in order to operate correctly. For such circuitry, it is customary to provide a power source such as a battery for the lower supply voltage $V_{DD1}$, and to derive the higher supply voltage $V_{DD2}$ from the lower supply voltage $V_{DD1}$ by means of a converter such as a DC/DC converter. However, it is also known to provide a power source such as a battery for the higher supply voltage, and to derive the lower supply voltage from the higher supply voltage by means of a voltage converter such as a DC/DC converter or a linear regulator. Hereinafter, the invention will be further explained for an illustrative example where the higher supply voltage $V_{DD2}$ is derived from the lower supply voltage $V_{DD1}$ by means of a DC/DC converter, but it will be understood that the invention is not limited to such embodiment.

The supply voltage for electronic circuitry needs to have a certain minimum value $V_{min}$ for the electronic circuitry to operate correctly. Such minimum value $V_{min}$ can be considered as a design characteristic of the circuitry. If the supply voltage to such circuitry would be higher than the minimum supply voltage $V_{min}$, the circuitry would still operate correctly but with a less-than-optimum energy consumption. Therefore, it would be desirable if the output voltage $V_{DD2}$ of the voltage converter would be constant and equal to $V_{min}$. However, in practice the output voltage of a voltage converter is not constant but is controlled to fluctuate in a control range between a lower limit $V_{LOW}$ and an upper limit $V_{HIGH}$. Herein, the lower limit $V_{LOW}$ is chosen to be approximately equal to the minimum supply voltage $V_{min}$, whereas the difference $V_{HIGH}-V_{LOW}$ is considered as a control margin. Thus, the converter in principle requires two operational parameters, i.e. $V_{HIGH}$ and $V_{LOW}$. In practice, $V_{HIGH}$ can be derived from $V_{LOW}$ by applying a fixed value $\Delta V=V_{HIGH}-V_{LOW}$; then, a converter needs only one input parameter $V_{LOW}$.

Conventionally, the boundaries of the control range of a converter are fixed. Then, in order to take into account possible manufacturing tolerances, $V_{LOW}$ should be chosen relatively high in comparison with $V_{min}$. This implies a relatively high energy consumption for most applications.

In order to overcome this problem, according to an important aspect of the present invention, a voltage converter is controllable in that it comprises a parameter input for receiving an input signal that indicates a suitable value for the lower limit $V_{LOW}$ of the control range of the DC/DC converter, while further the voltage converter is adapted to control its output voltage $V_{DD2}$, derived from an input voltage $V_{DD1}$, to be at least equal to the lower limit $V_{LOW}$ as derived from the parameter signal received at said parameter input. Preferably, the parameter signal is a voltage level identical to $V_{LOW}$.

In contrast to $V_{min}$, which is a design characteristic, $V_{LOW}$ is an operational parameter, which must be suitably set for achieving an acceptable balance between energy consumption and safety margin. If the value of $V_{LOW}$ would be chosen too high, the mean energy consumption of the integrated circuit would be undesirably high. On the other hand, if the value of $V_{LOW}$ would be lower than $V_{min}$, the supply voltage to the integrated circuit might drop below $V_{min}$, in which case the integrated circuitry would operate incorrectly or not at all.

A problem in this regard is that the exact, actual value of $V_{min}$ depends on, inter alia, the process "history", i.e. the exact process conditions during manufacture of the voltage converter, so that the exact, actual value of $V_{min}$ may differ from one individual voltage converter to another. Further, $V_{min}$ is not constant but depends on, inter alia, the temperature of the integrated circuit. Therefore, it is desirable to have a parameter source for providing the control parameter $V_{LOW}$ for the voltage converter, which parameter source takes the above-mentioned dependency into consideration.

SUMMARY OF THE INVENTION

It is a further object of the present invention to provide such a parameter source.

According to an important aspect of the present invention, a parameter source for providing the control parameter $V_{LOW}$ is designed such that the characteristics of its output signal match substantially the characteristics of $V_{min}$ of the electronic circuitry. In a preferred embodiment, the parameter source comprises a voltage controlled oscillator (VCO) which is controlled to generate a constant frequency, wherein the VCO is implemented in the same chip as the said electronic circuitry, and wherein the control parameter $V_{LOW}$ is derived from the control voltage to the VCO. In a more preferred embodiment, said voltage controlled oscillator is incorporated in a phase locked loop (PLL) for controlling the VCO.

U.S. Pat. No. 5.359.300 discloses a PLL for use in a radio pager, wherein the function of the PLL is to generate frequencies for the pager. The components of the PLL operate on a first supply voltage $V_{DD1}$, provided by a battery. One component of the PLL (more specifically: a charge pump of the PLL) is supplied with a second supply voltage $V_{DD2}$. This second supply voltage $V_{DD2}$ is derived from the battery voltage $V_{DD1}$ by means of a DC/DC converter. Herein, the DC/DC converter only serves, as part of the PLL, to achieve a correct functioning of the PLL. The DC/DC converter comprises a switching transistor, which switches a booster coil, said switching transistor being controlled by a frequency signal that is derived from a frequency signal of the PLL. However, this publication does not disclose or suggest the concept of the present invention. More particularly, this publication does not mention the problem underlying the present invention, i.e. that an electronic circuitry needs to have a certain minimum supply voltage $V_{min}$, nor does this publication provide a solution to this problem by disclosing a voltage converter which is controlled by a parameter signal indicating the lower limit $V_{LOW}$ of the control range of the converter.

BRIEF DESCRIPTION OF THE DRAWING

The above-mentioned and other aspects, characteristics and advantages of the present invention will be further clarified by the following description of a preferred embodiment of a control circuitry in accordance with the invention, with reference to the drawings, in which same reference numerals indicate equal or similar parts, and in which.

DESCRIPTION OF THE PREFERRED EMBODIMENTS

Figure 1:
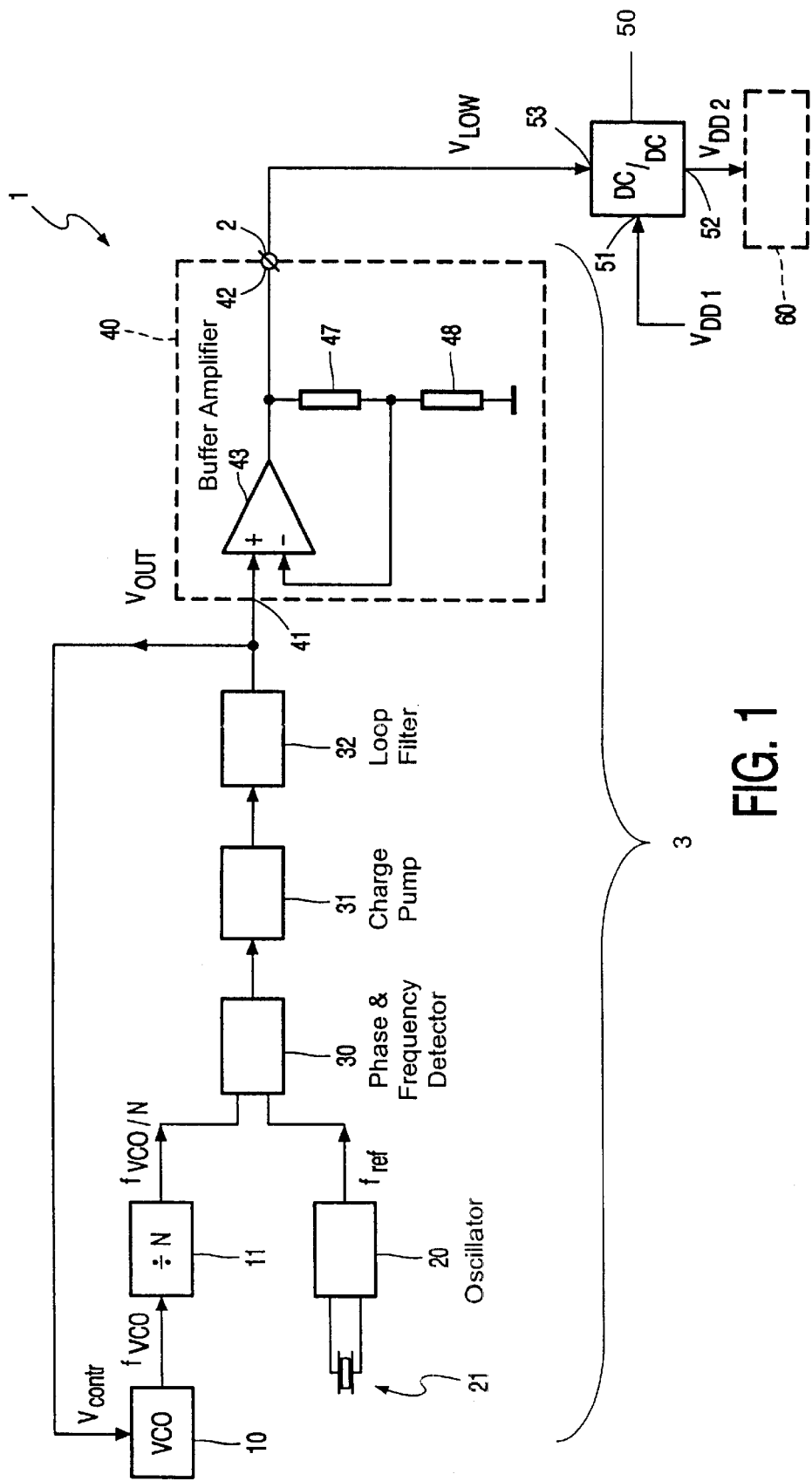
FIG. 1 shows schematically a functional block diagram of a power supply voltage generator with a voltage converter provided with a parameter source.

FIG. 1 shows schematically a functional block diagram of a power supply voltage generator 1 in accordance with the present invention, which is designed for supplying a supply voltage $V_{DD2}$ to chip circuitry 60. This chip circuitry 60 may for instance be circuitry in a mobile phone application, or any other type of electronic equipment where minimum power supply drain is of utmost importance. More particularly, the supply voltage $V_{DD2}$ for the electronic chip circuitry 60 needs to have a certain minimum value $V_{min}$ for the electronic chip circuitry 60 to operate correctly. On the other hand, for low energy consumption, the supply voltage $V_{DD2}$ should be as low as possible. Therefore, the power supply voltage generator 1 is designed to generate the supply voltage $V_{DD2}$ in such a way, that these needs are met, as will be explained more elaborately.

Figure 2:
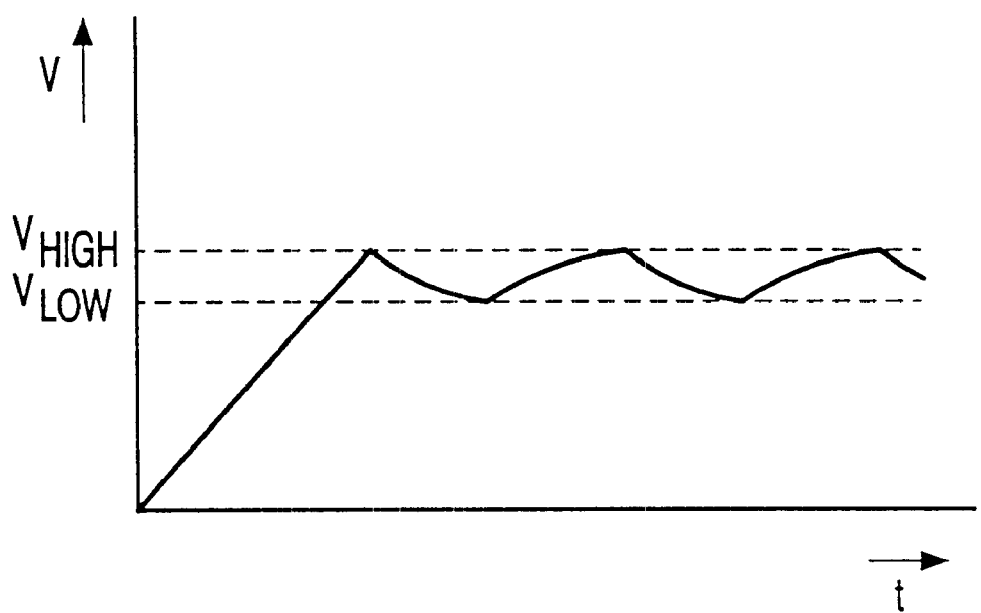
FIG. 2 shows schematically the conversion, behaviour of a voltage converter.

The power supply voltage generator 1 comprises a voltage converter 50, which in the illustrated embodiment is a DC/DC converter, with a primary voltage input 51 for receiving a first supply voltage $V_{DD1}$, and a secondary voltage output 52 for delivering a second supply voltage $V_{DD2}$. In principle, the voltage converter can be any type of known voltage converter, of a type wherein the output voltage level is controlled to fluctuate in a control range between a lower limit $V_{LOW}$ and an upper limit $V_{HIGH}$, as illustrated in FIG. 2. Therefore, the construction and operation of a voltage converter will not be explained here in more detail. However, in contrast to conventional voltage converters where the lower limit $V_{LOW}$ is a fixed value, the voltage converter 50 according to the present invention comprises a parameter input 53 for receiving an input parameter control signal that indicates a suitable value for the lower limit $V_{LOW}$ of the control range of the converter, while further the voltage converter 50 is adapted to control its output voltage $V_{DD2}$, derived from the input voltage $V_{DD1}$, to be at least equal to the lower limit $V_{LOW}$ as derived from the parameter signal received at said parameter input.

The power supply voltage generator 1 further comprises a voltage parameter source circuitry 3 for generating the control parameter signal $V_{LOW}$, having an output 2 connected to the parameter input 53 of the voltage converter 50.

In the preferred embodiment of FIG. 1, the parameter signal is a voltage level identical to $V_{LOW}$.

The voltage parameter source circuitry 3 comprises a voltage-controlled oscillator 10, which provides a VCO-signal $f_{VCO}$, and which is controlled by a control voltage signal $V_{contr}$ in such a way that said VCO-signal $f_{VCO}$ is a substantially stable signal. The control parameter signal $V_{LOW}$ is derived from said control voltage signal $V_{contr}$. Preferably, as shown in FIG. 1, the voltage parameter source circuitry 3 comprises a buffer amplifier 40, receiving the control voltage signal $V_{contr}$ at its input 41, and providing a buffered amplified voltage signal at its output 42. In the example of FIG. 1, the buffer amplifier 40 comprises an opamp 43, having its non-inverting input coupled to the input 41 of the buffer amplifier 40, and having an output coupled to the output 42 of the buffer amplifier 40. The output signal of the opamp 43 is fed back to an inverting input of the opamp 43 through a signal dividing pair of resistors 47, 48.

In the preferred embodiment as shown in FIG. 1, control of the VCO 10 is achieved by incorporating the VCO 10 in a phase locked loop configuration, as will be explained in the following.

The VCO output signal $f_{VCO}$ is supplied to a divider 11 which provides a divided signal $f_{VCO/N}$ to a first input of a phase and frequency detector 30. An oscillator 20, comprising a quartz crystal 21, generates an output signal $f_{ref}$, which is coupled to a second input of the phase detector 30, if desired through a second divider, which is however not shown for the sake of simplicity. The phase detector 30 compares its two input signals $f_{VCO/N}$ and $f_{ref}$ and outputs an error signal which is applied as control signal to a charge pump 31.

The charge pump 31 outputs a voltage signal, which depends on the output signal of the phase detector 30, and which, preferably through a loop filter 32, is fed back as control signal $V_{contr}$ to a control input of the VCO 10 for controlling the frequency of the output signal $f_{VCO}$ of the VCO 10. The magnitude of the control signal $V_{contr}$ will be such that the output signal $f_{VCO}$ of the VCO 10 will follow the output signal $f_{ref}$ of the oscillator 20. In principle, the output signal $f_{ref}$ of the oscillator 20 is a stable signal, therefore the magnitude of the control signal $V_{contr}$ will have a constant value. The control signal $V_{contr}$ is considered as output signal $V_{OUT}$ of the phase locked loop circuitry.

The DC/DC converter 50 receives the first supply voltage $V_{DD1}$, for instance from a power supply such as a battery (not shown), and converts the input first supply voltage $V_{DD1}$ to a second supply voltage $V_{DD2}$, based on the input control parameter signal $V_{LOW}$ received from the circuitry 1. As mentioned above, the second supply voltage $V_{DD2}$ is controlled within a control range between $V_{LOW}$ and ($V_{LOW}+\Delta V$), and $V_{LOW}$ is set to be approximately (or exactly) equal to the minimum supply voltage $V_{min}$ required by the circuitry 60. The operational parameter $V_{LOW}$, which is derived from the VCO control signal $V_{contr}$ is matched to the characteristic minimum supply voltage $V_{min}$ of the circuitry 60 by a suitable setting of the gain factor of the buffer amplifier 40, as will be clear to a person skilled in the art. It will be understood that a suitable relationship between $V_{contr}$ and $V_{LOW}$ can be achieved by other means than an opamp circuitry. For instance, buffer amplifier 40 may be replaced by a software controllable amplifier, the gain of which can be set by means of software for tuning after production.

As mentioned above, the minimum supply voltage $V_{min}$ required by the circuitry 60 is not constant: for instance, it depends on the crystal temperature of the chip of the circuitry 60, and on the manufacturing process used to manufacture the chip of the circuitry 60. In order to take this dependency into consideration, the VCO 10 of the voltage parameter source circuitry 3 is implemented on the same chip as the circuitry 60. In a particular embodiment, the entire power supply voltage generator 1 is implemented on the same chip as the circuitry 60. The level of the VCO control signal $V_{contr}$ necessary for keeping the divided VCO signal $f_{VCO/N}$ in pace with the oscillator reference frequency $f_{ref}$ depends on the same parameters as the minimum supply voltage $V_{min}$ required by the circuitry 60, while further both dependencies are the same or at least similar. For instance, if crystal temperature increases, the minimum supply voltage $V_{min}$ required by the circuitry 60 for a correct operation increases while the VCO control signal $V_{contr}$ increases, too. Further, for a manufacturing process which yields slower transistors, the minimum supply voltage $V_{min}$ required by the circuitry 60 for a correct operation is higher while the VCO control signal $V_{contr}$ is higher, too.

Thus, it will be clear that, even under changing conditions, the second supply voltage $V_{DD2}$ for the circuitry 60 is adaptively generated in such a way that an acceptable balance between energy consumption and safety margin is maintained.

It should be clear to a person skilled in the art that the scope of the present invention is not limited to the examples discussed in the above, but that several amendments and modifications are possible without departing from the scope of the invention as defined in the appending claims.

What is claimed is:

1. Power supply voltage generator (1) comprising a controllable voltage converter (50), with a primary voltage input (51) for receiving a first supply voltage ($V_{DD1}$), and a secondary voltage output (52) for delivering a second supply voltage ($V_{DD2}$); the voltage converter (50) being arranged to control the level of its output voltage ($VDD_2$) within a range between a lower limit ($V_{LOW}$) and an upper limit ($V_{HIGH}$); the voltage converter (50) further comprising a parameter input (53) for receiving an input parameter control signal that indicates a suitable value for said lower limit ($V_{LOW}$).

2. Power supply voltage generator (1) for providing a second supply voltage ($V_{DD2}$) for an electronic circuitry (60), comprising:

a controllable voltage converter (50);

a voltage parameter source circuitry (3) for generating a voltage parameter signal ($V_{LOW}$) which is substantially equal to a minimum supply voltage value ($V_{min}$) of the electronic circuitry (60); and wherein the voltage parameter source circuitry (3) has an output (2) provided as a parameter input (53) to the voltage converter (50).

3. Power supply voltage generator (1) according to claim 2, wherein the voltage parameter source circuitry (3) is designed such that the characteristics of its output signal match substantially the characteristics of $V_{min}$ of the electronic circuitry (60).

4. Power supply voltage generator (1) according to claim 2, wherein the voltage parameter source circuitry (3) comprises a voltage controlled oscillator (VCO) (10) which is controlled to generate a constant frequency, wherein the VCO (10) is implemented in a same chip as the electronic circuitry (60), and wherein the control parameter ($V_{LOW}$) is derived from the control voltage to the VCO.

5. Power supply voltage generator (1) according to claim 4, wherein said VCO (10) is incorporated in a phase locked loop (PLL) for controlling the VCO (10).

6. Power supply voltage generator (1) according to claim 5, wherein the VCO (10) provides a VCO-signal ($f_{VCO}$);

wherein the VCO (10) is controlled by a control voltage signal ($V_{contr}$) so that said VCO-signal ($f_{VCO}$) is a substantially stable signal; and wherein said control signal ($V_{LOW}$) is derived from said control voltage signal ($V_{contr}$).

7. Power supply voltage generator (1) according to claim 6, wherein the voltage parameter source circuitry (3) comprises an amplifier (40), receiving the control voltage signal ($V_{contr}$) at an input (41), and providing an amplified voltage signal at an output (42) as said control parameter signal ($V_{LOW}$), such that said control parameter signal ($V_{LOW}$) differs from said control voltage signal ($V_{contr}$) substantially only by a gain factor.

8. Power supply voltage generator (1) according to claim 7, wherein said gain factor of the amplifier (40) is presettable by means of software.

9. Power supply voltage generator (1) according to claim 5, wherein an output of the VCO (10) is coupled to a first input of a phase and frequency detector (30), through a divider (11);

wherein the voltage parameter source circuitry (3) further comprises an oscillator (20), comprising a quartz crystal (21), an output of which is coupled to a second input of the phase and frequency detector (30);

wherein an output signal of the phase and frequency detector (30) is applied as control signal to a charge pump (31); and wherein an output signal of the charge pump (31), through a loop filter (32), is fed back as control signal ($V_{contr}$) to a control input of the VCO (10) for controlling the frequency of the output signal ($f_{VCO}$) of the VCO (10).

* * * * *